June 13, 1933.  I. SAUERWALD  1,914,299

TIRE CHAIN FASTENER

Filed Oct. 27, 1932

INVENTOR
Irwin Sauerwald,
By Archworth Martin,
Attorney.

Patented June 13, 1933

1,914,299

UNITED STATES PATENT OFFICE

IRVIN SAUERWALD, OF YORK, PENNSYLVANIA, ASSIGNOR TO THE McKAY COMPANY, OF PITTSBURGH, PENNSYLVANIA, A CORPORATION OF PENNSYLVANIA

TIRE CHAIN FASTENER

Application filed October 27, 1932. Serial No. 639,791.

My invention is herein described as employed more particularly in connection with its application to anti-skid chains for vehicle wheels, but it will be understood that various features of the invention are susceptible of use in various other ways.

One object of my invention is to provide an improved fastener of the buckle type which will hold a strap against slipping, without the necessity of weakening the strap by providing perforations in the strap or providing toothed members which bite into the strap.

Another object of my invention is to provide a fastening device of such form that it may be conveniently employed to hold anti-skid chains on the treads of vehicle wheels at desired degrees of tension and with minimum danger of loosening.

Still another object of my invention is to provide a strap buckle device of such form that it will not become displaced on the body portion of the strap even though the strap end is in disassembled relation to the buckle, and even though the strap be not under tension.

Figure 1:
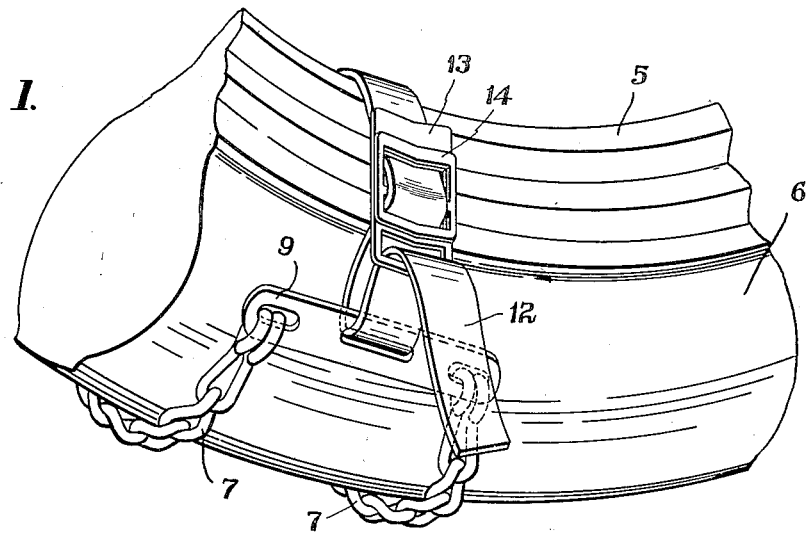
Figure 2:
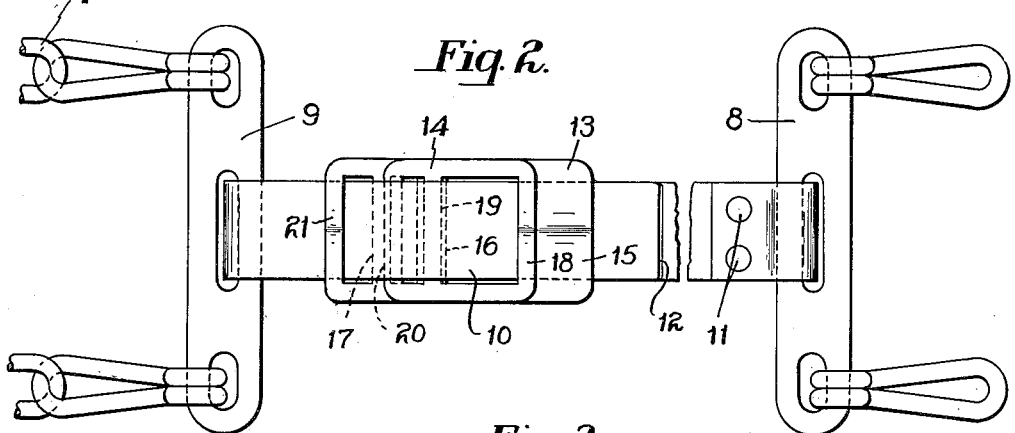
Figure 3:
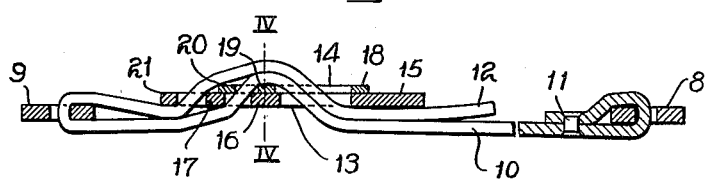
Figure 4:
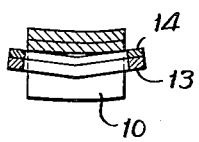

In the accompanying drawing, Figure 1 shows a portion of a vehicle wheel with my fastening device applied thereto; Fig. 2 is a plan view, on an enlarged scale, of a portion of the structure of Fig. 1; Fig. 3 is a longitudinal sectional view through the structure of Fig. 2, and Fig. 4 is a sectional view taken on the line IV—IV of Fig. 3.

A portion of a wheel rim or felly 5 is shown that carries a tire 6 in the usual manner. Anti-skid cross chains 7 are disposed across the tread of the tire, and these chains may be of any suitable form. The ends of the chains are connected to plates or bars 8 and 9. The chains need not, of course, be arranged in pairs, since a single cross chain could be connected to bars corresponding to the bars 8 and 9, or more than two cross chains could be connected to said bars.

The chains are intended to function in the manner of any various known types of anti-skid chains, including those wherein a complete series of cross chains are connected at their ends to side chains that are disposed against the sides of the tire or the wheel rim. The present invention is shown as employed in connection with what is sometimes termed unit chains that consist of one or more cross chains, each one or each group of which is individually secured to the vehicle wheel, independently of the others, by separate fastening means, instead of all of the cross chains being connected to the usual annular side chains.

A strap 10 is looped at one end through the bar 8 and is fastened thereto by rivets 11, while the other end of the strap extends through the central slot in the bar 9, when the chains are in place upon the wheel.

The turned-back end 12 of the strap is maintained in place by a buckle which consists of a buckle plate 13 and locking plate 14. The body portion of the strap extends through slot-like openings in the buckle plate that are formed by what are in effect cross bars 15, 16 and 17, and between cross bars 18, 19 and 20 of the locking plate 14.

The plates 13 and 14 are curved slightly in a transverse direction to conform somewhat to the circumferential curvature of the rim 5, and so that the longitudinal corners of the plate 15 will not cut into or grip the wheel rim. The said curvature of the plates also results in their more effectively gripping the strap and holding it against slipping.

The end portion 12 of the strap, when the parts are in assembled position, extends beneath the end bar 21 of the plate 13, over the bars 17 and 20, and beneath the end bar 15. The locking plate 14 is loosely supported on the buckle plate 13, except insofar as it is held in engagement therewith by the strap 10, which is threaded therethrough, as above-described. The plate 14 may therefore have sliding movement on the plate 13 to facilitate the insertion of the strap 10. The buckle plate 13 may, of course, be slid to any convenient location on the strap 10, when the strap is bent or folded to disengage it from the corners of the various cross bars with which it engages. This position will, of course, be adjusted to suit various sizes of tires and wheel rims.

When the buckle parts and the strap occupy the positions shown in Figs. 1 and 3, the locking plate 14 is disposed on the buckle plate 13 in approximately the position shown in Fig. 3, with the cross bars 19 and 20 thereof offset from the bars 16 and 17 of the buckle plate. The sides of the strap engage corners of these bars, as shown more clearly in Fig. 3, which corners exert a biting action to prevent slipping of the buckle plate on the strap even though the end 12 of the strap is untensioned, as shown in Fig. 1, and is not threaded through the buckle plate.

It has been found that even with this loose assemblage, the buckle plate will not slide on the strap, apparently because of the biting action of the corners of the cross bars 16, 17, 19 and 20, as above-explained, and it has further been found that the plate 14 will be maintained in the position shown in Fig. 3, and in biting engagement with the adjacent portions of the strap, so that even though the anti-skid device be thrown around when it is off the wheel, the buckle will not become displaced thereon, but will remain in set position.

The strap end 12 is held in position in the buckle by its engagement with the corners of the bars 21, 17 and 20, and its extremity is held down by the bar 15. The biting action of the cross bars, as above-referred to, is further enhanced by the fact that they are of annular or convex form at their undersides.

I claim as my invention:—

1. The combination with a strap, of a buckle plate having a plurality of cross bars which form slot-like apertures in the plate, and a locking plate slidably supported on the buckle plate and having spaced cross bars offset relative to certain of the first-named cross bars, in directions longitudinally of the strap, one portion of the strap extending in a single tortuous path through the spaces between certain of the cross bars of both plates and beneath the end bars of both plates.

2. The combination with a strap, of a buckle plate having a plurality of cross bars which form slot-like apertures in the plate, and a locking plate slidably supported on the buckle plate and having spaced cross bars offset relative to certain of the first-named cross bars, in directions longitudinally of the strap, the body portion of the strap extending in a tortuous path between certain of the cross bars of both plates, and beneath the end bars of both plates, and an end portion of the strap being bent back into overlying relation to the body portion thereof and extending through spaces between other bars of both plates.

3. The combination with a strap, of a buckle plate having a plurality of cross bars which form slot-like apertures in the plate, and a locking plate slidably supported on the buckle plate and having spaced cross bars offset relative to certain of the first-named cross bars, in directions longitudinally of the strap, the body portion of the strap extending in a tortuous path between certain of the cross bars of both plates, and an end portion of the strap being bent back into overlying relation with the body portion thereof and extending through spaces between other bars of both plates, both straps being in underlying relation to the end bars of the first-named plate.

4. The combination with a strap, of a buckle plate having a plurality of cross bars which form slot-like apertures in the plate, and a locking plate slidably supported on the buckle plate and having spaced cross bars offset relative to certain of the first-named cross bars, in directions longitudinally of the strap, the strap extending in a tortuous path through the spaces between certain of the cross bars of both plates, and the plates being of convex form at one side, in directions transversely of the plates.

5. The combination with strap portions arranged in the form of two layers, of a buckle plate having relatively spaced cross bars at its ends and intermediate its ends, and a locking plate slidably supported on the buckle plate and having cross bars, one strap layer extending beneath the said end bars and over an intermediate bar, and the other strap layer being disposed beneath the end bars and over a bar of the locking plate.

6. The combination with strap portions arranged in the form of two layers, of a buckle plate having relatively-spaced cross bars at its ends and intermediate its ends, and a locking plate slidably supported on the buckle plate and having cross bars, one strap layer extending beneath the said end bars and over a bar of the locking plate, and the other strap layer being disposed between the first-named strap layer and the said end bars, and overlying another bar of the locking plate.

7. The combination with strap portions arranged in the form of two layers, of a buckle plate having relatively spaced cross bars at its ends and intermediate its ends, and a locking plate slidably supported on the buckle plate and having cross bars, one strap layer extending beneath the said end bars and over a bar of the locking plate, and the other strap layer being disposed between the first-named strap layer and the said end bars and overlying an intermediate bar and a bar of the locking plate.

8. The combination with strap portions arranged in the form of two layers, of a buckle plate having cross bars at its ends and cross bars intermediate its ends, a locking plate slidably supported on the buckle plate and having cross bars, one strap layer extending beneath the said end bars, between the intermediate bars, and over a bar of the locking plate, and the other strap layer being disposed between the first-named strap layer and the said end bars and overlying the intermediate bars and a bar of the locking plate.

In testimony whereof I, the said IRVIN SAUERWALD have hereunto set my hand.

IRVIN SAUERWALD.